United States Patent
Sylvester et al.

(10) Patent No.: US 11,042,563 B1
(45) Date of Patent: Jun. 22, 2021

(54) DATABASE INTERFACE SYSTEM

(71) Applicant: On Full Display, LLC, Austin, TX (US)

(72) Inventors: Meghan Sylvester, Austin, TX (US); Aaron Snyder, Austin, TX (US); Justin Sylvester, Austin, TX (US); Dmitry Maslennikov, Moscow (RU)

(73) Assignee: PERFECTQUOTE, INC., Austin, TX (US)

( * ) Notice: Subject to any disclaimer, the term of this patent is extended or adjusted under 35 U.S.C. 154(b) by 157 days.

(21) Appl. No.: 16/428,569

(22) Filed: May 31, 2019

Related U.S. Application Data

(62) Division of application No. 16/020,292, filed on Jun. 27, 2018, now Pat. No. 10,311,079.

(60) Provisional application No. 62/525,506, filed on Jun. 27, 2017.

(51) Int. Cl.
| | |
|---|---|
| *G06F 16/00* | (2019.01) |
| *G06F 16/25* | (2019.01) |
| *G06F 16/904* | (2019.01) |
| *G06F 9/54* | (2006.01) |
| *G06F 9/451* | (2018.01) |

(52) U.S. Cl.
CPC ........ *G06F 16/258* (2019.01); *G06F 9/451* (2018.02); *G06F 9/54* (2013.01); *G06F 16/252* (2019.01); *G06F 16/904* (2019.01)

(58) Field of Classification Search
CPC ...... G06F 16/258; G06F 9/451; G06F 16/904; G06F 16/252; G06F 9/54
See application file for complete search history.

(56) References Cited

U.S. PATENT DOCUMENTS

| | | | |
|---|---|---|---|
| 9,235,652 B1 | 1/2016 | Jeffrey | |
| 2003/0093436 A1 | 5/2003 | Brown | |
| 2005/0015439 A1 | 1/2005 | Balaji | |
| 2007/0299698 A1* | 12/2007 | Anandarao | G06Q 40/00 705/4 |
| 2017/0212997 A1* | 7/2017 | Buonfiglio | G06Q 10/06393 |
| 2018/0336640 A1* | 11/2018 | Dziabiak | G06F 16/2455 |

OTHER PUBLICATIONS

Notice of Allowance dated Apr. 17, 2019 for U.S. Appl. No. 16/020,292 (pp. 1-7).
Office Action dated Dec. 6, 2018 for U.S. Appl. No. 16/020,292 (pp. 1-8).

* cited by examiner

*Primary Examiner* — Hung Q Pham
(74) *Attorney, Agent, or Firm* — Loeb & Loeb LLP

(57) ABSTRACT

A database interface system uses individual application program interfaces to receive, convert, combine, and normalize if necessary, datasets received from disparate sources. The datasets may include quotes from various insurance providers. The categorized and normalized data may be further processed for presentation via a user interface that allows selective display of the full combined datasets or graphically selected subsets of the full datasets.

14 Claims, 11 Drawing Sheets

FIG. 11
Prior Art

DATABASE INTERFACE SYSTEM

CROSS-REFERENCE TO RELATED APPLICATION

This is a divisional application of U.S. patent application Ser. No. 16/020,292, filed on Jun. 27, 2018, of which claims priority to U.S. Provisional Application 62/525,506 filed on Jun. 27, 2017, the entire contents of which is incorporated by reference for all purposes.

TECHNICAL FIELD

This disclosure is directed to enhanced computer systems and more particularly to a database system, application, and application program interface for the normalizing and display of complex data.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Data sets that are received from disparate sources are often difficult to compare due to variations in both the base data and in the formatting of that data. In some industries, such as the commercial insurance industry, the use of standard database techniques leads to intermediate manual steps to request, receive, review, reformat and present such data causing delays, errors, and inefficiencies.

SUMMARY

A machine learning engine is coupled with a database and application program interface (API) running on a server. The system stores large amounts of similar but disparate, data and supports queries that selectively locate, filter, sort, and extract individual data elements from the similar data that meet the query criteria. Using this technique, highly focused queries can return relevant responses from the disparate data. The APIs may provide for both data formatting differences as well as to analyze the information in the datasets for inconsistencies and for variations in initial conditions that may affect further downstream processing. User interface techniques may be employed to allow selection and comparison of various aspects of the raw data. Data visualization optimization may support presentation of summary data from the disparate data sources. A data lake may be employed for storing, selecting, and re-storing raw and processed data.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

FIG. 11 is a screen shot illustrating a portion of tabular data from a prior art implementation.

DETAILED DESCRIPTION

Figure 1:
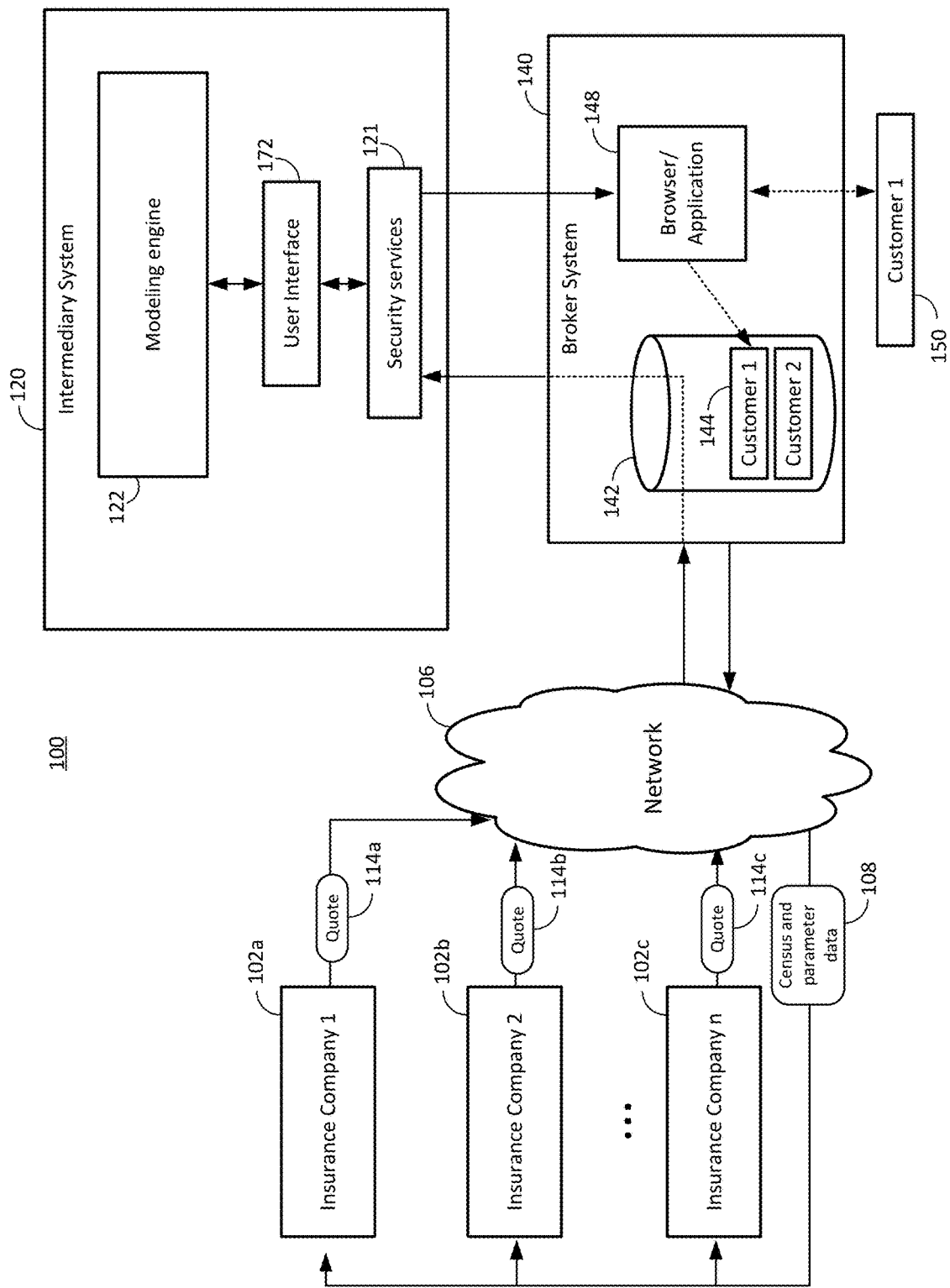
FIG. 1 is a simplified block diagram of a system for improved capture and presentation of data according to the current disclosure.

FIG. 1 illustrates at a high level one embodiment of a system 100 for improved capture and presentation of data for participants in an insurance offering. The system 100 may include one or more insurance companies 102a, 102b, 102n (collectively, the insurance carriers 102). The broker 140 may have a process for capturing customer requirements. For example, in an embodiment, the broker 140 may have a simple spreadsheet for entering census, claims history and quote parameters. The collected data may include information on the customer's employees, including names, salaries, ages, addresses, history of illness, personally identifiable information, and roles. The quote parameters may include data related to insurance types, benefits, deductibles, coverages, premiums, etc. Generally, the insurance companies 102 receive a request for quote from a broker 140 about a particular customer 150 and provide quote information for the customer back to the broker 140. The broker 140 may then review the quotes with the end customer 150. Even in cases where only one insurance company responds, there may be multiple quotes for different insurance plan options across several product types (medical, dental, vision, etc.) from that one insurance company.

Figure 5:
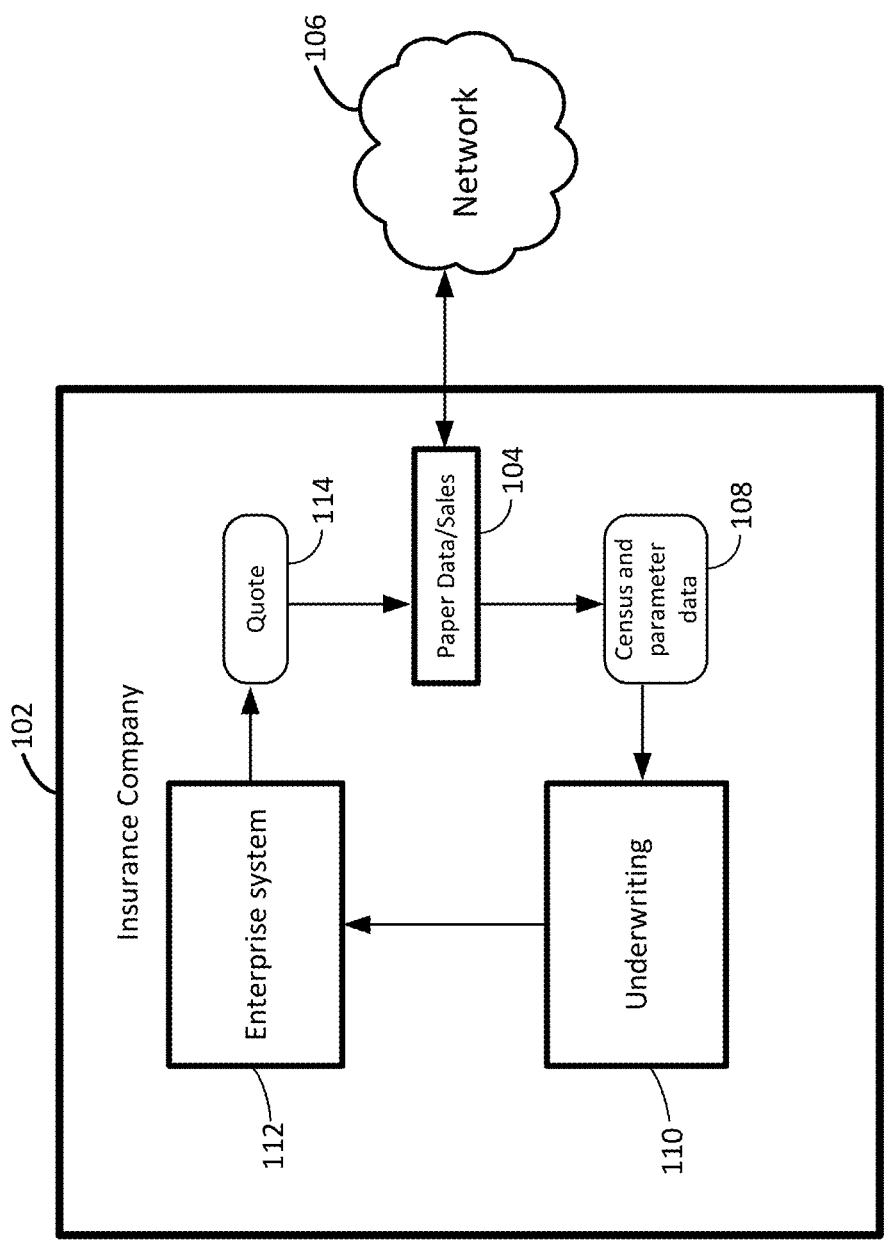
FIG. 5 is a block diagram illustrating a prior art flow at an insurance carrier.

Turning briefly to FIG. 5, a representative process inside an insurance carrier 102 is described in order to provide a background for the disclosure. A request for proposal (RFP) may include census, claims and parameter data 108 that are received by a sales team 104 from a broker 140 via a network 106. In an embodiment, this RFP may be transmitted in an email. The network may be a public network, such as the Internet. In an embodiment, the network 106 may be a private network using, for example, a virtual private network capability so that communications are secure even when using a public wide area network such as the Internet. The census data may include, in an embodiment, information about employees such as ages, history of illness, and job roles. The parameter data may include customer requirements or requests related to deductibles, benefits, co-payments, out-of-pocket expenses, premiums, coverages, etc. The sales team 104 may pass the census and parameter information 108 to an underwriter in an underwriting team 110 who prepares a risk analysis and quote information. The policy may be underwritten on an in-house enterprise system 112 and a quote may be prepared. Each insurance company's enterprise system 112 may present quotes in different formats using different applications. For example, one insurance carrier may use a spreadsheet such as Microsoft Excel® while another carrier may use a word processing program such as Microsoft Word®, and yet another may simply send a portable document file (pdf). Further, variations for policy parameters may be captured via a "rate grid" that can include hundreds or even thousands of variations on the base policy rates and terms. The sales team 104 may then deliver the quote to the broker via the network 106, typically via email. Once a carrier has developed a quote format, that format is generally stable over a long period of time. This long-term stability offers some benefits, as discussed more below.

In a prior art environment, the broker 140 may then read and manually enter the data received from the insurance company into a consolidated spreadsheet, including all or selected portions of the rate grids in a process called spreadsheeting. If more than one quote is received from an insurance carrier or from multiple carriers, the separate quotes and their associated rate grids must also be entered into the spreadsheet. With different carriers, these additional quotes often use different programs and are almost always in a different format but also must be manually entered alongside the data from the other carriers for presentation to the customer. Differences in naming conventions, formatting, and policy terms must be comprehended and manually adjusted while generating the consolidated spreadsheet. The consolidated spreadsheet of FIG. 11 may include dozens or more individual worksheets and even when summarized may include tens or hundreds of more printed pages. Errors in this process are common, not to mention the data that is ignored and thrown away in the summarization for printing. Should a customer request another variation of a policy, such as higher deductibles, the entire process may be repeated beginning with either a new quote from the underwriters 110 or, if the data exists, a new spreadsheeting exercise by the broker with, for example, previously discarded data.

Returning to FIG. 1, the illustration shows that the census and parameter data 108 is transferred to the various insurance companies 102a, 102b, and 102n via the network 106. After processing as discussed above, the quotes 114a, 114b, and 114n, are provided by the carriers via the network 106. In this embodiment, rather than the quotes being operated on by the broker 140, as would be done in the prior art case, the quotes may be sent to an intermediary 120. In another embodiment, the insurance carriers 102 may send the quotes 114 directly to the intermediary 120, or in one other embodiment example, the broker 140 may simply redirect the quotes 114 to the intermediary 120, for example, by forwarding an email with quote data received from a company 102a.

The intermediary 120 may have a modeling engine 122 that processes the multiple quotes from each insurer as well as the multiple layers of quote data within each overall quote. In the event that quote information is provided in an image format, such as a portable data file (pdf), a conversion process may optically character recognize and format the file before extracting the data for further processing. In an embodiment, a dedicated pdf to text converter may be used to extract data, for example, to a spreadsheet. For example, a two-step converter may be used that first extracts text with minimal formatting and then generates relationships for placing items in spreadsheet cells. In an embodiment, a smart tool (not depicted), may determine formulas associated with cells by observing mathematical relationships between nearby cells. Even if the original value is kept, a reviewing or downstream analysis tool may note the formula for a cell to predict the expected impact of a proposed change.

The intermediary system may include a user interface 172 that receives and formats data based on the downstream recipient of the response data. In one embodiment, a corresponding application 148 at the broker 140 may simply be a browser so that the user interface 172 provides response data in a suitable form, such as JavaScript. In other embodiments, the application 148 may be a dedicated application, such as a smartphone application, that can receive and process information in a customizable format. In an embodiment, security services 121 may ensure access control and data privacy between the broker 140 and the intermediary system 120.

The stability in response formatting from the insurance companies 102 enables standardized data extraction tools that allow information to be found, labeled (if needed), and characterized for later use in by an analysis tool, at least on a per-insurance company basis. As discussed more below, an analysis engine 130 (FIG. 4) may include a machine learning tool that may be used to both identify response data as well as to perform inbound and outbound data checking, correction, and error flagging, if needed. That is, the analysis engine 130 may learn both the required data for a complete RFP as well as the characteristics of a company's response. Data may be searched for and found other places in a current data package or may be requested when the needed data is not found. While illustrated in use for data returned from an insurance company 102, this process may be applied to RFP data to help ensure accurate and complete RFP packages, which may in turn, reduce inaccurate responses from insurance companies 102.

Figure 2:
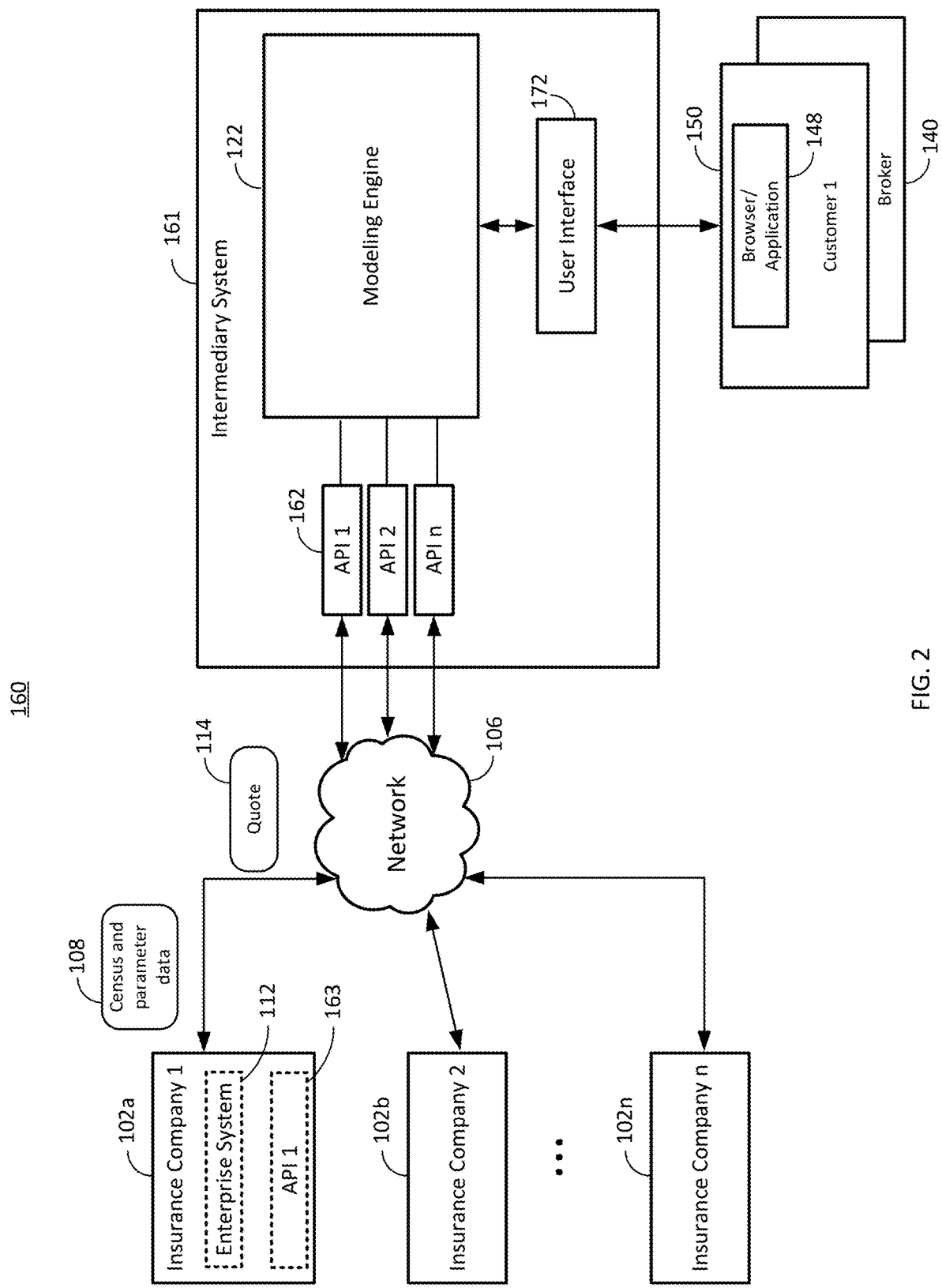
FIG. 2 is a simplified block diagram of another embodiment of a system for improved capture and presentation of data according to the current disclosure.

FIG. 2 illustrates an alternative system 160 for improved capture and presentation of data for participants in an insurance offering. In this embodiment, the data flow is different from the embodiment of FIG. 1. Instead of receiving data from and sending data to the broker 140 as in FIG. 1, in the embodiment of FIG. 2, each insurance carrier 102 is connected by an application program interface (API) 162 that sends the census and parameter data 108 and receives the quote data 114 via an intermediary 161.

In one embodiment, the application program interface resides primarily in the intermediary system 161 and are adapted to the data exchange requirements of the individual insurance companies 102. In another embodiment, a component 163 of the API may be installed at the insurance company 102a. In this case, the insurance company 102a may benefit from increased security and access control since the component 163 may be dedicated to a single endpoint (the intermediary 161) and may be under the control of the insurance company 102 itself.

In this embodiment, the API 162 makes it possible for either one-way or two-way interactions with the insurance carrier's enterprise system 112 (see FIG. 5). When so enabled, the alternate system 161 may be able to transfer data directly into the enterprise system 112, in order to avoid the cost and errors introduced by manual entry of quote data and/or information that may be omitted by broker or employer with respect to the census and claims information. That is, the API 162 may have knowledge of how the customer data is captured and stored and with the cooperation of the carrier 102a, may have the knowledge of how the enterprise system 112 expects data when provided with census and quote request information. The API 162 may be programmed to extract the customer data and reformat it for direct reception by the enterprise system 112. The API 162 may further have the necessary protocol handlers, authentication routines, and security processing, such as encryption/decryption to enable safe handling of sensitive data including employee information and competitive information from carriers. The API 162 is discussed in more detail below with respect to FIG. 3.

After the API 162 receives the quote 114 from the carrier 102a, the relevant data may be operated on in the modeling engine 122 as discussed more below with respect to FIG. 4. The processed data may be formatted for display by use by application 148, which may be same or similar to the application 148 described above.

As opposed to the data flow of FIG. 1 where the broker is the hub for all data transfers, in this embodiment, RFP information flows from the broker 140, or even directly from the customer 150 to the intermediary system 161 and from there to the insurance companies 102a, 102b, 102n. In this embodiment, the user interface 172 may prompt the broker 140 or customer 150 for entering census and other parameters required for requesting a proposal or quote from an insurance company. The modeling engine 122 or the user interface itself may support prompting for needed data and support real-time data checking, for example, that numbers are not entered where text is required.

Figure 11:
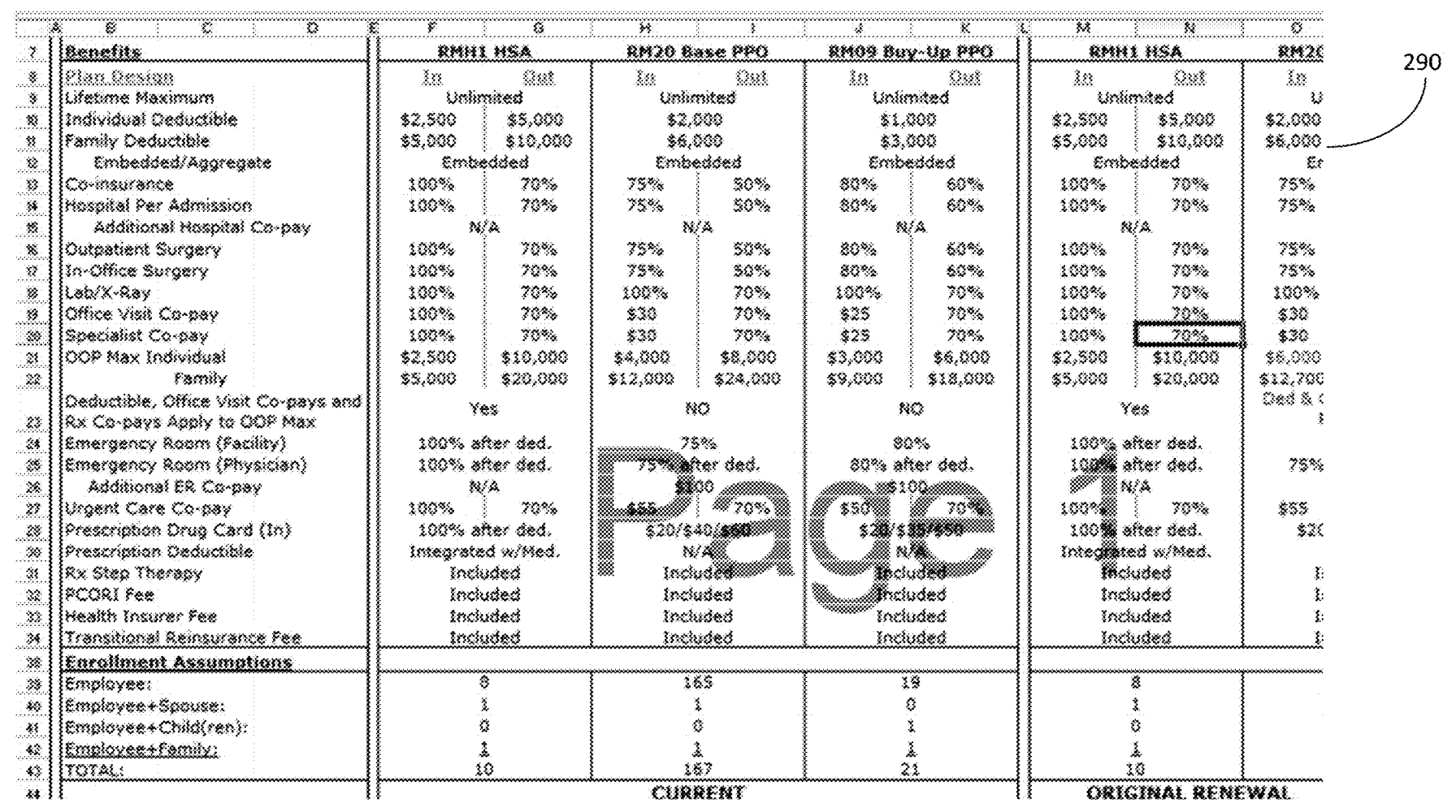

In order to clarify the environment in which the intermediary system 161 is operating, the discussion will look at some of the data being transferred among entities. Turning briefly to FIG. 11, a screenshot 290 illustrating one section of a composite spreadsheet is shown. To the extent that one column may represent quote information from one vendor, the screenshot 290 may also illustrates data received from a carrier in a quote package 114a. An analytics engine 130, discussed below with respect to FIG. 4 may include machine learning functions that can use heuristics to recognize data by not only its rote position, but by the nature of the data and its surroundings. When a particular value is outside an expected range or diverges significantly from other carrier's quotes, the analytics engine 130 may flag that data for further review or directly request clarification via the API 162. The training process may include identifying row and column title data and manually reviewing outlier data over a number of quotes. By learning title information and applying heuristics, the analytics engine 130 can account for minor differences in column and row titles as well as differences in formatting such as decimals and currency symbols. The use of the analytics engine 130 and its associated machine learning capabilities may save significant time in the production of output data since small, or even not so small variations in quote data 114a may be accounted for without complicated programming to adjust for the new format while maintaining backward compatibility should, for example, different carrier offices use slightly different versions of their output packages.

Figure 3:
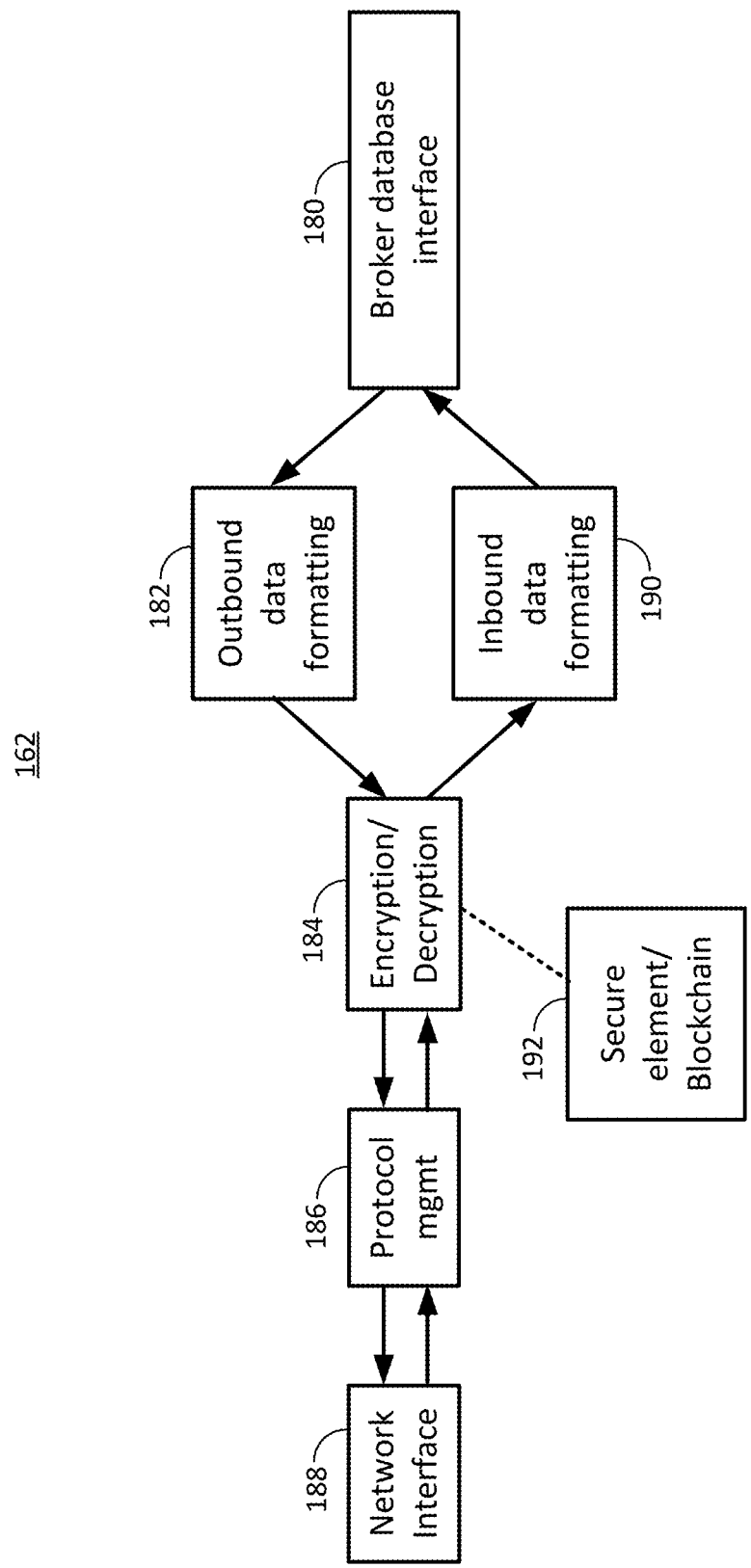
FIG. 3 is a block diagram of components of an application program interface (API) according to the current disclosure.

Turning now to FIG. 3, a block diagram of one embodiment of the API 162 is discussed and described. In this embodiment, a broker database interface 180 may be used to first extract data from a broker system (not depicted) used to capture customer data, that is, census data and quote parameters 108. This data may be passed to an outbound data formatting module 182. The module 182 may be insurance carrier specific and may reformat and recode the data as necessary. For example, the data may be reformatted from ASCII to binary or Unicode and may be recoded to an XML format with tagged data. The nature of the transformation will be predicated on the requirements specified by the carrier 102a for automated entry of the data.

After formatting, the data may be encrypted at by an encryption module 184. The encryption module may use keys stored in a secure element 192 and agreed to by the insurance company 102a. The process for mutual key generation and key updates are not discussed further, but are well known in the industry. A protocol module 186 may be used to manage handshaking, login procedures, data transfer and error handling during communication with the company 102a via the network interface module 188.

In addition to encryption, and in the return process, decryption, the encryption module 184 may support verification and non-repudiation via a private or consortium blockchain function. Unlike a public blockchain that requires a difficult problem (work function) to be solved in a public network, a private or consortium blockchain uses rules set up by the system owner (private) or a group of overseers (consortium or permissioned) to govern who can participate and who can view transaction histories. The use of blockchain technology may reduce the overhead associated with tracking status as requests and quotes move through the process. A blockchain ledger may provide not only accuracy and confirmation of data transfers but also the ability to confirm acceptance of a particular quote without the delays associated with printing, signing, and transmitting physical documents.

Quote data 114a returned from the carrier 102a may follow the reverse path, with the network interface module 188 and protocol modules 186 responsible for the transfer of the quote data at the hardware and logical layers. The quote 114a may be decrypted at the encryption module 184 and sent to the inbound data formatting module 190. Separate modules for inbound and outbound data may be used since the size and formatting of the census and parameter data 108 may be much different that the size and formatting of the quote data 114a. The inbound data formatting module 190 may extract information from the quote data 114a and reformat and transform the data as necessary to place the data in a condition for use by the broker database interface 180 and ultimately by the data processing module 168, as discussed more below. The embodiment of the API 162 illustrated in FIG. 3 is but one of many configurations that can be used to accomplish the task of sending and receiving data in varying formats. For example, each functional block of the outbound path may be separate from a corresponding module on the inbound path.

Figure 4:
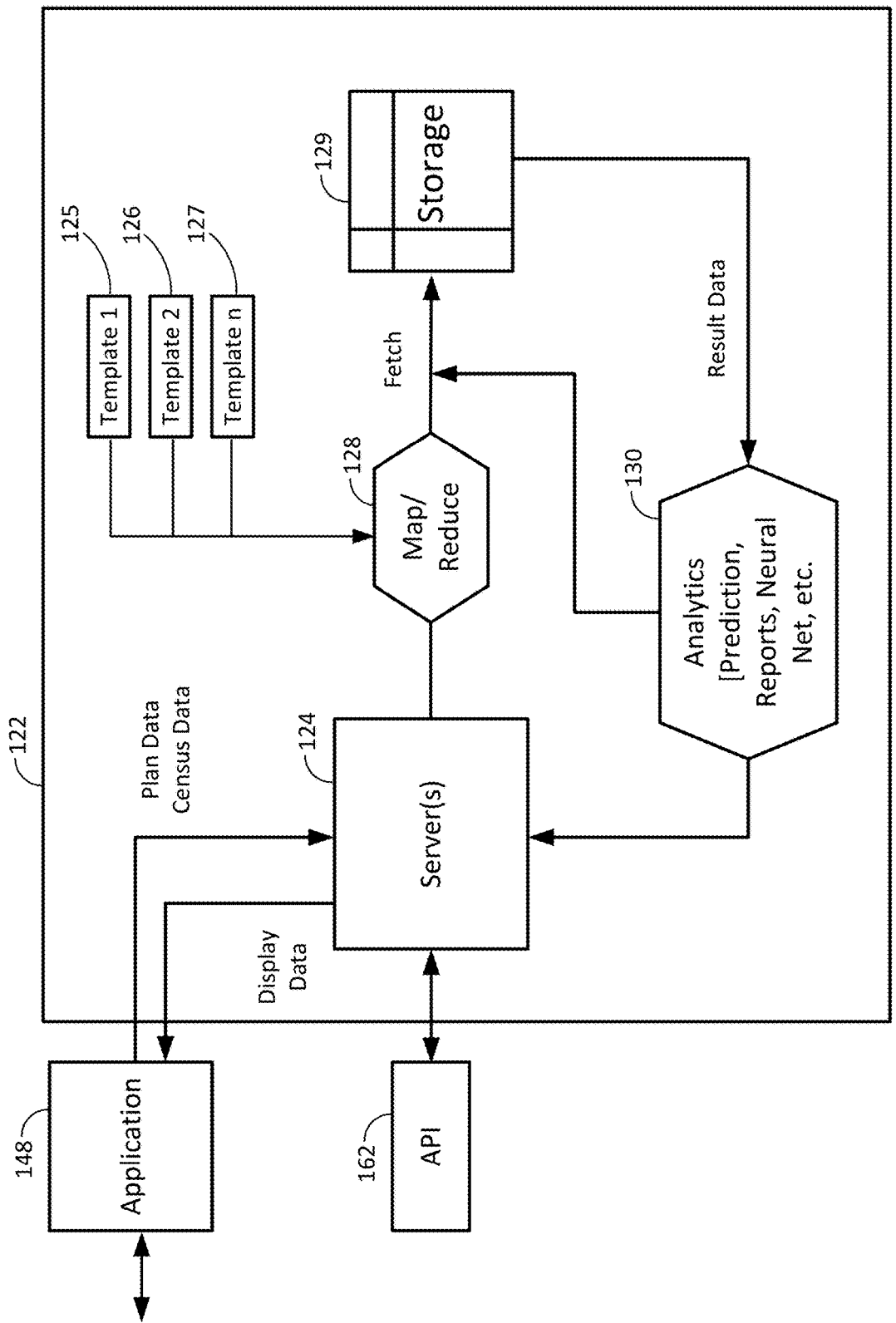
FIG. 4 is a block diagram of a modeling engine suitable for use in the embodiments of FIGS. 1 and 2.

FIG. 4 is a block diagram of an exemplary and representative modeling engine 122. The modeling engine 122 may include a server 124. The server 124 may be a dedicated single server, but in many cases may be more complex and include cloud storage, distributed servers, clusters, and other related big data services. The server 124 may implement, via the API 162, access to the various external data sources including insurance carriers 102. The server 124 may also host the data formatting required for creating presentation-ready data for the application 148. In addition, the server 124 may handle any remaining end-to-end encryption/decryption not handled in the API 162, as discussed above or with the application 148.

In an embodiment, various templates 125, 126, 127 may be prepared and used in processing data from individual carriers 102. Each template 125, 126, 127 is developed specifically for that insurance carrier so that the quote information and rate tables can be extracted from whatever program and format they are received in and transformed into a standard format. These templates 125, 126, 127 may be customized as needed to read each carrier's format. In some embodiments, Word and Excel macros may be developed to extract the data while in other embodiments another program entirely may be used to find and extract the data. In an embodiment, a particular language that is good at string operations may be used to develop such a program. The templates 125, 126, 127, may be used by a map/reduce function 128. The map/reduce function 128 may be used to capture, format, and preprocess big data. For example, a particular data may have tags or other characteristics that define their importance. The map/reduce function 128 may first filter and sort, such as sorting medical coverage quotes by deductible and then reducing the data by counting the number the plans meeting a deductible criteria. The map/reduce function 128 allows parallelizing large dataset problems on the server 124, for example, by placing different mapped data to be distributed to separate servers for reduction by the appropriate key that was used to map the data.

The resulting data may be stored in a storage facility, such as a data lake 129. The use of a data lake may be used as a single store for all raw data and for the transformed data created by the map/reduce function 128. In some cases, the data lake may store data in a non-hierarchical format, such as flat files or collections of spreadsheets, rather than in traditional nested tables. Once the data is extracted from each quote, the data may be stored in an intermediate format using, for example, extensible markup language (XML) or another tagged format that allows the individual data elements to be identified by name and/or type so that common data from different carriers can be identified. Because the data lake 129 allows access to large amounts of both raw data and reduced data, the data lake 129 is useful for quickly generating different quote outputs from one or more very large quote responses from one or more insurers 102. The results of particular requests may be passed to an analytics engine 130 for report generation, processing by a neural network, etc. The output of the analytics engine 130 may be fed forward to the server 124 for use in report generation and may also be fed back into the data lake 129 for storage or as the basis of a subsequent search. The analytics engine 130 may use the data lake 129 to search and locate both apples-to-apples data from each carrier as well as apples-to-oranges data that does not lend itself to exact comparison with other carrier quote information or which may require some normalization to be relevant in its presentation.

The server 124 may create output data such as user experience (UX) data that can be transported to the broker 140 for presentation to the customer 150 or directly to the customer, depending on the application. In an embodiment, the UX data may be platform neutral, such as HTML or JavaScript for display in a browser. In another embodiment, the UX data may be in a spreadsheet format and a custom program may be used to display the data and allow interactions using the application 148.

Figure 6:
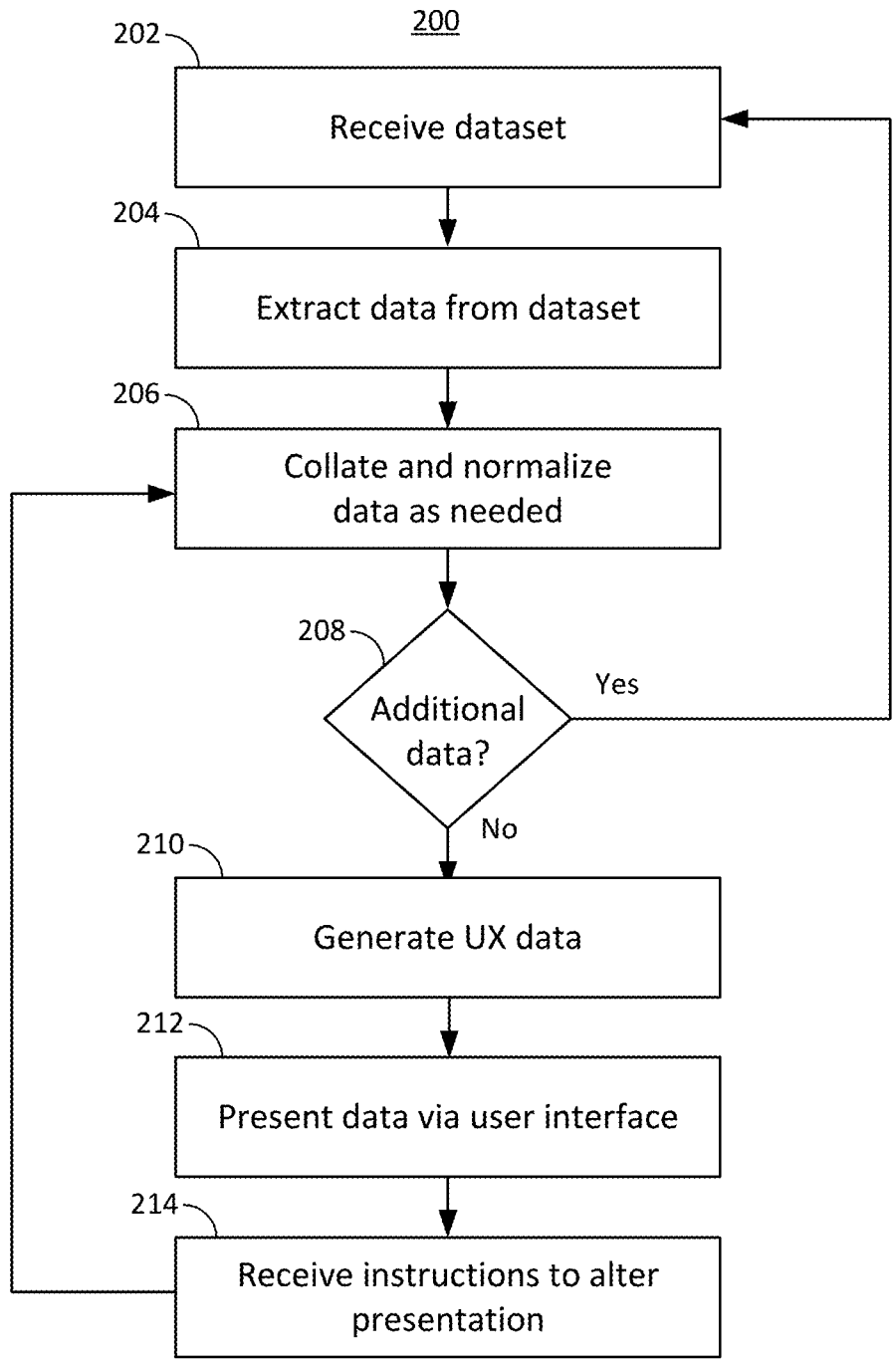
FIG. 6 is a flowchart of a method of capturing, selecting, and presenting data.

FIG. 6 is a flowchart of a method 200 of improved capture and presentation of data for participants in an insurance offering. The method 200 focuses on the processing and display of quote data 114 received from one or more insurance carriers 102. At block 202, quote data 114a may be received either at an intermediary 120 for the embodiment of FIG. 1 or at an API 162 for the embodiment of FIG. 2. At block 204, individual data elements related to the quote may be extracted from the quote data file as received. In various embodiments, the extracted data may be transformed or normalized as needed to match the requirements of the application 148 being used by a broker or end-user.

At block 208, a determination may be made as to whether there is additional quote data available. The additional quote data may be alternative offers from the same carrier or unprocessed offers from a different carrier. If more data exists, the 'yes' branch may be taken from block 208 to block 202 so that the next quote data may be received. In an embodiment, the 'yes' branch may return to block 204 if all the data has been received but has not yet been processed.

When no more data is available, the 'no' branch from block 210 may be taken to block 210 where user interface, or user experience (UX) data may be generated. The UX data may simplify largely tabular data, see, e.g., the table in FIG. 11, into textual and graphical formats that when presented at block 212 may be easier to conceptualize and compare, see, e.g., FIGS. 7-10. Execution of the method 200 may continue at block 214 where changes to the displayed data may be accomplished by the use of graphical controls, such as sliders and buttons, as illustrated in FIGS. 7-10. In some cases, the updated data may be generated from data already stored in the data lake 129 or may be requested new from one or more insurers 102. That is, some requests for data may require only finding, filtering, and reducing data already in hand or may require additional data to be requested with different census or quote data.

Figure 7:
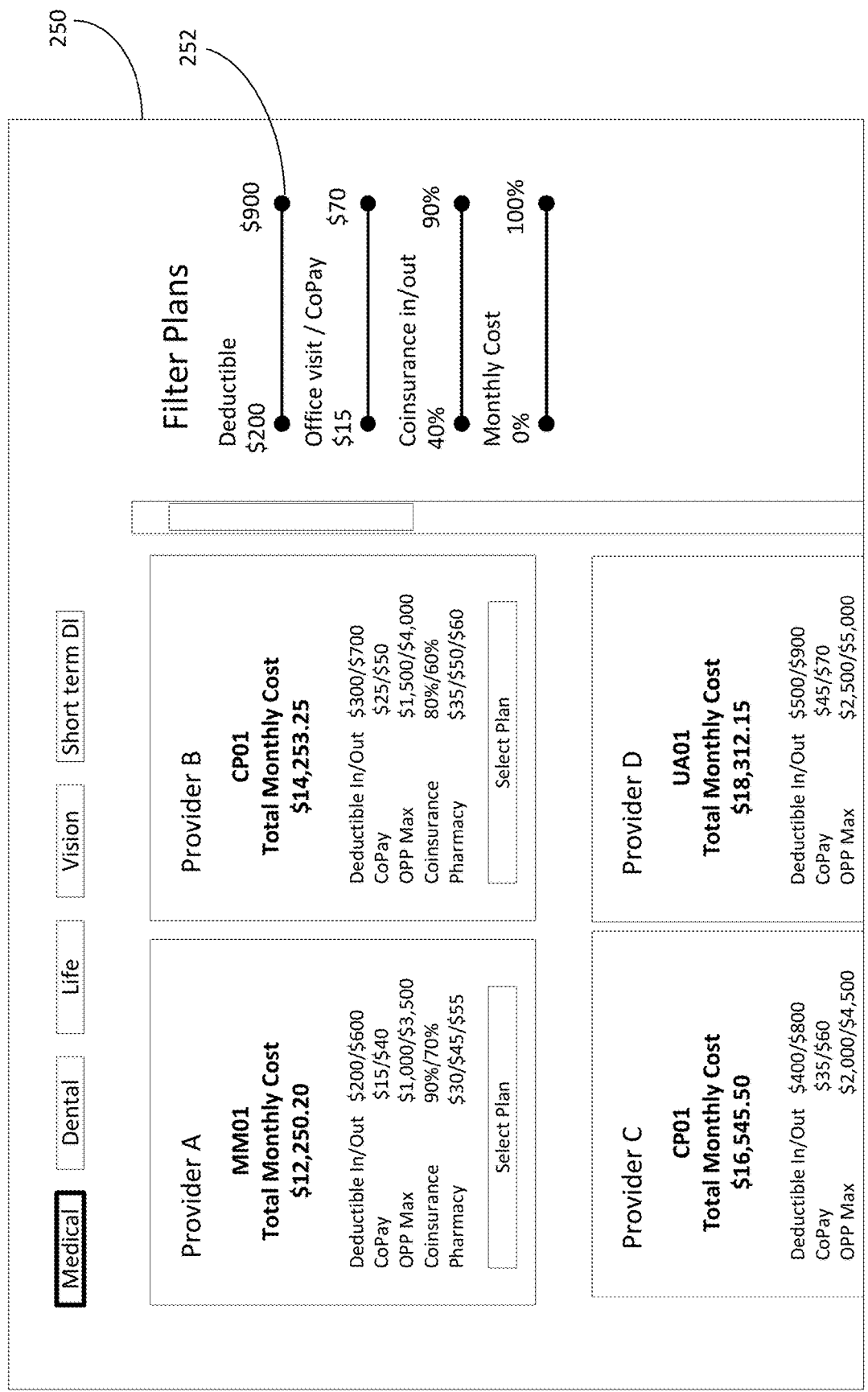
FIGS. 7-10 are screen shots illustrating different aspects of a user interface of the system of FIGS. 1 and 2.
Figure 8:
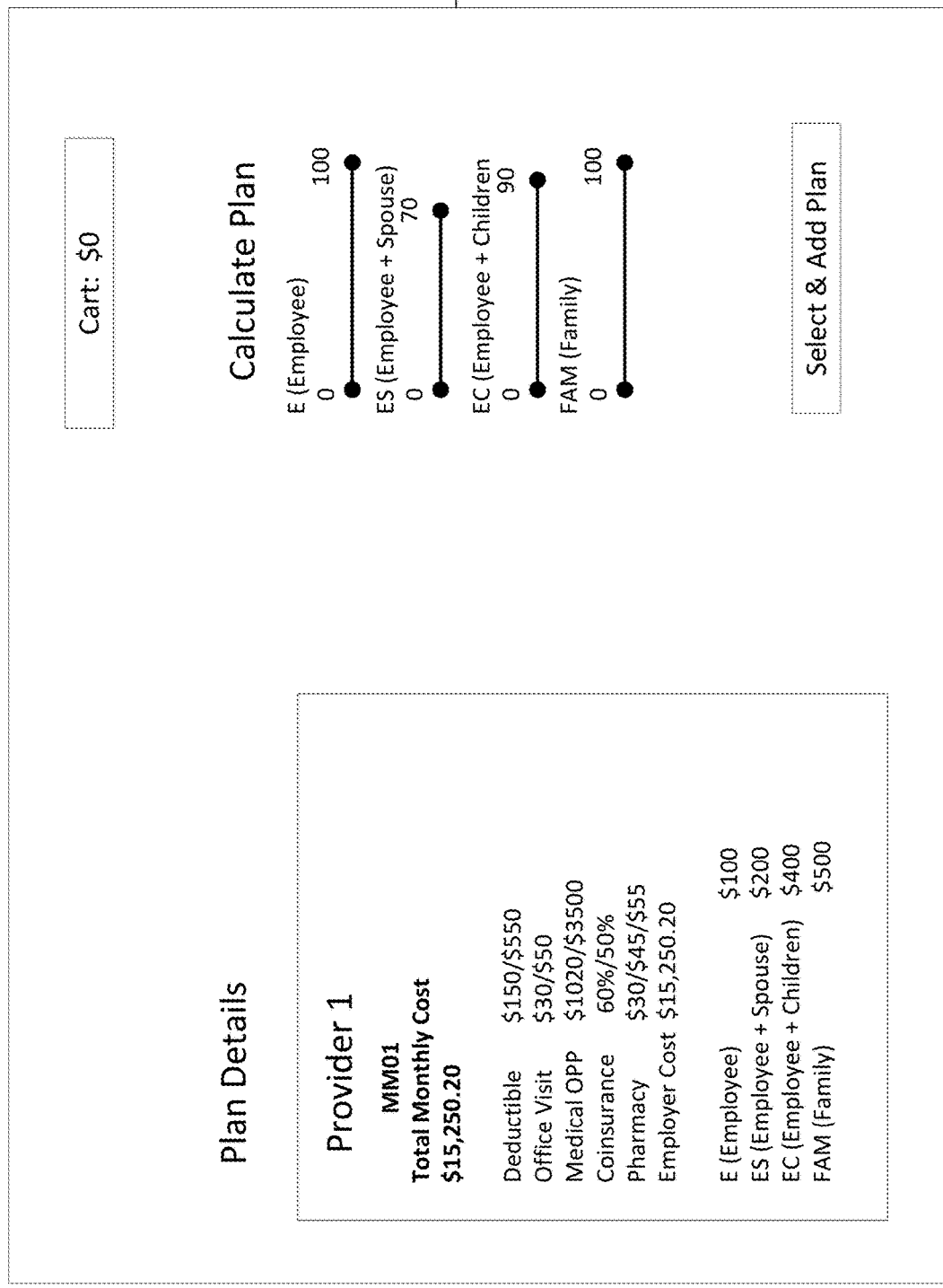
Figure 9:
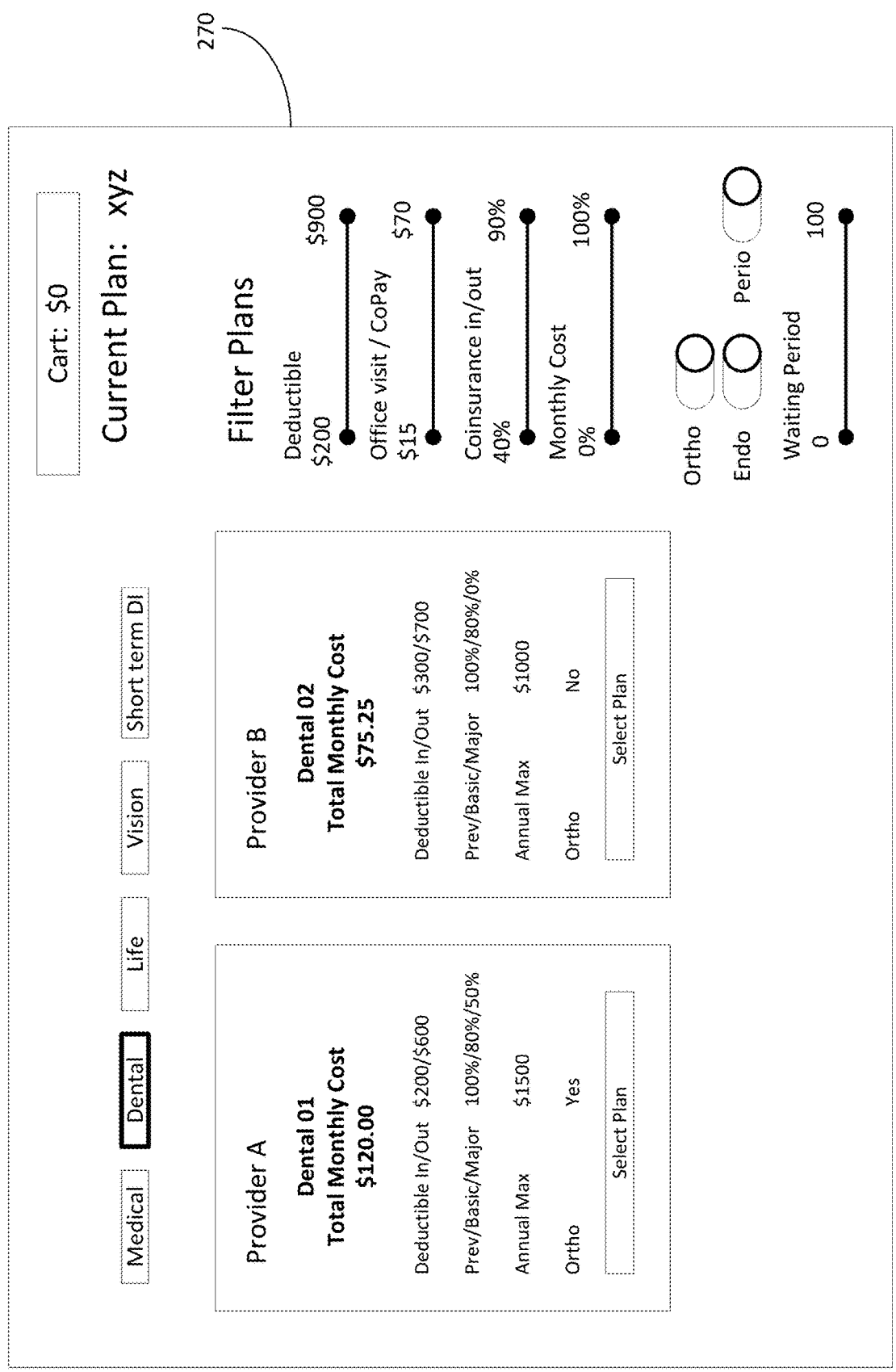
Figure 10:
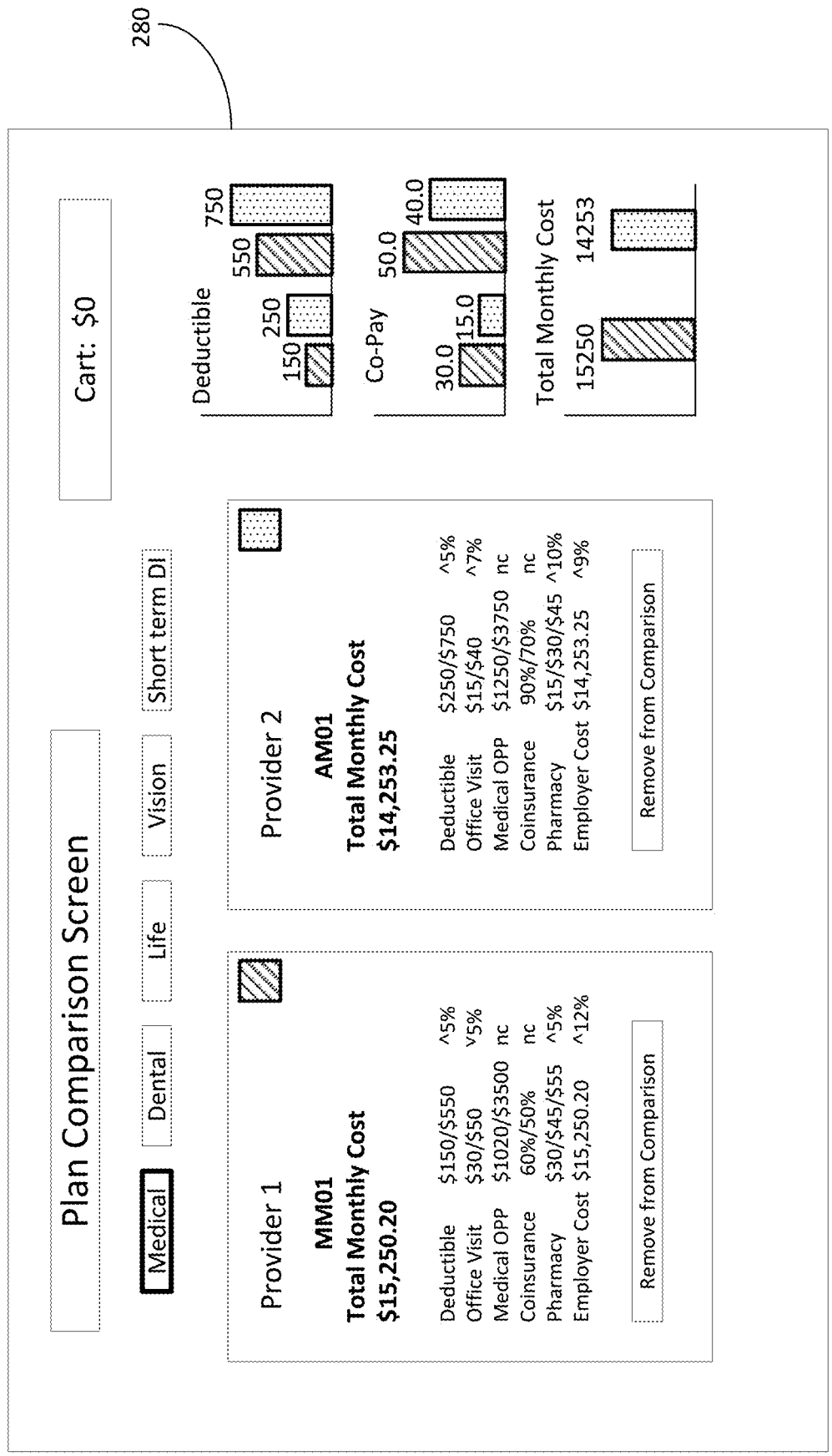

FIGS. 7-10 illustrate exemplary screenshots illustrating views of data and comparisons between carriers and policy options. FIG. 7 is a screenshot 250 illustrating a summary of multiple medical plans and various sliders that allow real-time filtering of plans based on cost, copay, deductible, etc. For example, in a case where 200 quote variations are stored in the data lake 129, the use of the deductible slider 252 may allow almost instant regeneration of those plans meeting the requested criteria using the data lake 129 as the source of raw data for regenerating the requested information. Compared to the prior art practice of spreadsheeting, this saves the request from being returned to a broker to manually scan through the raw data and repopulate spreadsheets with the requested variations. FIG. 8 is another screenshot 260 showing plan details for a single provider allowing generation of quote data from sliders similar to those discussed above. FIG. 9 is a screen shot 270 that illustrates a comparison of dental plans. The filter section of FIG. 8 is different from the filters of FIG. 6 due to the nature of the coverage. For example, orthodontics has a simple on/off switch rather than a value-based slider shown for deductible. FIG. 9 is another screenshot 280 illustrating a text summary of two dental plans and different options for filtering and viewing quote variations. FIG. 10 illustrates a text summary of plan data with corresponding bar graphs to graphically illustrate certain aspects of the plans.

FIG. 11 is a portion of a prior art spreadsheet 290 illustrating a manually prepared composite spreadsheet for comparing of multiple insurance plans. The spreadsheet is included only for illustration of the complexity of evaluating a plan prior to the developments disclosed here.

While the example used here is directed to commercial employer benefits insurance, the concepts presented are applicable to many different industries with multi-variable data sets such as manufacturing, travel, shipping, insurance of different types, etc. For example, in travel, when considering price of an itinerary involves not only the out of pocket cost but the number and location(s) of intermediate stops, price of baggage, etc.

The technical problem solved by this disclosure is accessing previously insurmountable volumes of data through the combination of large scale servers 124, the use of on demand map/reduce functions and the integration of data lake storage 129 for accessing both raw and previously processed data from one storage area. Prior art systems did not attempt to store and process the volumes of data contemplated nor offer graphical user interface tools for allowing rapid restructuring of the relevant data for presentation to a user.

All parties benefit from the systems 100, 160 in accordance with the current disclosure. Brokers benefit from faster and more accurate translation of quote data received from a carrier. Carriers benefit from direct transfer of data received from carriers (in the API version of FIG. 2) and also benefit from the accuracy and simplicity of broker-side presentation of quote data. In some embodiments, the brokers may be bypassed altogether allowing end customers to request and receive meaningful quotes directly from an insurer. Because the quotes are more accurate, the insurance companies can spend less time clearing up misunderstanding caused by transcribing errors. Because the quotes are easier to comprehend and present, the broker is likely to present more options to a client, potentially giving an insurer more customer exposure. The customer benefits both through the potential presentation of more alternatives, the ease of comparing those alternatives and the improved accuracy of the quotes. The customer also benefits through the availability of a user interface that provides a simplified way to compare quote data and see the impact of changes to individual parameters.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of processing partially correlated data from disparate data sources, the method comprising:
   receiving, via a processor, encrypted first data from a first data source, the encrypted first data in a first non-standard format;
   decrypting, via the processor, the encrypted first data using keys stored in a secure element;
   converting, via a formatting module, the decrypted first data from the first non-standard format to a standard format;
   performing, via the processor, a map/reduce function that extracts first elements from the decrypted first data in the standard format;
   storing, via the processor, the first elements in a data lake;
   analyzing, via the processor, the first elements for differences from second elements in the data lake;
   generating, via the processor, display data that includes the differences; and
   sending, via the processor, the display data to an application,
   wherein a delta is displayed on a user interface, the delta showing the differences and at least one of the first elements and the second elements.

2. The method of claim 1, wherein receiving encrypted first data from the first data source comprises receiving the encrypted first data responsive to a first request made to the first data source, the first request including a census of a specific population.

3. The method of claim 1, wherein encrypted second data is received responsive to a second request.

4. The method of claim 3, wherein the second request including a census of a specific population.

5. The method of claim 1, wherein the encrypted second data is in a second non-standard format and is received from a second data source.

6. The method of claim 5, further comprising decrypting, via the processor, the encrypted second data using second keys stored in a second secure element.

7. The method of claim 6, further comprising converting, via the formatting module, the decrypted second data from the second non-standard format to the standard format.

8. The method of claim 1, wherein a first request is generated at the application and sent to the first data source.

9. The method of claim 1, further comprising accessing the data lake to identify both the first elements and the second elements.

10. The method of claim 9, wherein analyzing the first elements for differences from the second elements in the data lake comprises selecting the first elements and the second elements according to requested criteria.

11. The method of claim 10, further comprising storing the differences in the data lake.

12. The method of claim 9, wherein analyzing the first elements for differences from the second elements in the data lake comprises filtering the first elements and the second elements according to the requested criteria.

13. The method of claim 10, wherein the requested criteria is obtained through a selection made using a switch or slider displayed on the user interface of the application.

14. The method of claim 1, wherein the application includes an application program interface (API) and sending the display data to the application comprises sending the display data via the API.

* * * * *